UNITED STATES PATENT OFFICE.

LIVERAS HULL, OF CHARLESTOWN, MASSACHUSETTS.

IMPROVED CAOUTCHOUC OR INDIA-RUBBER.

Specification forming part of Letters Patent No. 37,866, dated March 10, 1863.

*To all whom it may concern:*

Be it known that I, LIVERAS HULL, a citizen of the United States, and a resident of Charlestown, in the county of Middlesex and State of Massachusetts, have made an invention of an improved product or composition of matter of which caoutchouc is a material substance or component part, its treatment or preparation in the manner and by the means as hereinafter described rendering it a new or improved article of manufacture, useful in the arts or for various purposes for which caoutchouc is generally employed; and I do hereby declare the said invention to be fully described as follows.

Caoutchouc when ground by means of rollers loses much of its original elasticity, which may be restored in a measure by the ordinary process known in the arts or to chemists by the name of the "heat vulcanizing process," the same consisting in combining or mixing flowers of sulphur with the caoutchouc and subsequently subjecting the compound or mixture, as the case may be, to a high degree of heat. In the mode of effecting my invention I do not employ the said vulcanizing process or any analogous mode of proceeding. In other words, I use no flowers of sulphur in mixture or combination with the caoutchouc; nor do I subsequently employ any high or even low degree of heat to operate on the said mixture or compound; but I employ, in application, connection, or in combination with the ground caoutchouc, certain chemical liquids or matters, as hereinafter mentioned; and in order to produce the result desired they are to be applied to or to be combined with the caoutchouc either by dipping the caoutchouc into a mixture of the said chemical liquids, or by spreading them in mixture on it, or by any other means by which the said caoutchouc may be properly subjected to their action, so as to produce with respect to the caoutchouc the desired effect—viz., its proper sulphuration without deleterious matters being left in it, the restoration of its elasticity, and the improvement of the caoutchouc in strength and in other respects.

In carrying out my invention I employ in connection with the caoutchouc a mixture of the fluids termed "chloride of sulphur" and "carbon spirits." Chloride of sulphur is well known to chemists and in the arts, and therefore needs no further explanation. Carbon spirits is a light fluid, whose specific gravity generally varies from 0.650 to 0.750. It is now made from the rock-oil produced from the oil-wells of Pennsylvania and Canada, and is a peculiar liquid, differing in many of its properties from either benzine or benzole, coal-naphtha, or sulphide of carbon. It has been but recently known in the arts.

Besides having all the advantages and useful properties of benzole or benzine in the mixture of the same with chloride of sulphur and the application of the mixture to caoutchouc, the carbon spirits is productive of new, useful, and highly important results or effects when in connection with the chloride, and both are combined with or applied to the caoutchouc as described or in the manner as herein specified, a new or improved caoutchouc composition or substance follows of great value in the arts.

Heretofore a mixture of chloride and sulphur with thirty or forty times its weight of sulphide of carbon has been used in the process of vulcanization without heat, and similar processes have been heretofore patented. Products or compositions of caoutchouc obtained as the results of these processes, however carefully prepared, have, after subsequent exposure to air and friction, exhibited changes of composition and texture. The injurious effect of leaving in the composition or manufacture any of the chemical agents employed thus becomes evident. In carrying out or producing my invention these active agents, after they may have performed their requisite functions, are removed, either by aided evaporation or a full decomposition of them, thus leaving the composition entirely free from these causes of decay and injury.

In the use of the carbon spirits and the chloride of sulphur with the caoutchouc the latter, on evaporation of the liquid element or parts removed from the composition by evaporation, will not be pulped, as is the case when benzine or benzole is used; and, furthermore, as before remarked, there is nothing adhesive or otherwise deleterious left behind in the caoutchouc calculated to injure it.

A remarkable or important characteristic or property of the carbon spirits when used with the chloride and on or in the caoutchouc, as set forth, is that it provides for the decomposition of any excess of the chloride, and at the same time removes such from the caoutchouc, and thus aids in preventing the injury which heretofore has generally resulted from the after action of the chloride of sulphur when employed in connection with caoutchouc.

Other advantages of the carbon spirits with reference to its application as herein set forth might be enumerated; but it is presumed that what has been stated will suffice to show its utility.

In the production of my invention one measure of the chloride of sulphur and forty measures of the carbon spirits may be employed, they, while being used, being in a state of mixture or combination, as the case may be. These proportions of the two liquids may, however, be somewhat varied, and the mixture be productive of good results. Into the said mixture or compound the caoutchouc is to be immersed for a shorter or longer period, as circumstances may demand. Generally speaking, when the caoutchouc is a thin sheet or mass a minute or thereabout for the immersion will suffice; but the time for effecting the desired result will be dependent on the thickness of the caoutchouc, its quality, and the state in which it may be. There are various other ways in which the liquid mixture may be combined with or be applied to the caoutchouc—as, for instance, it may be spread thereon, or it may be either pressed or forced more or less upon or into the mass by suitable means and pressure duly applied. After the application of the mixture to the caoutchouc, as set forth, evaporation of the liquid characteristic of the mixture should be allowed or be caused to take place, in which case there will be left incorporated with the caoutchouc a certain element or elements of the mixture, which will cause the compound to be greatly improved with reference to the caoutchouc in the ground state, or in that state which it had before the application to it of the said mixture of chemical matters or liquids, as well as with reference to caoutchouc vulcanized or sulphurized in other ways without heat, the composition being free from distinctive agents heretofore left in it by the old mode of vulcanizing without heat. The action of the mixture on the caoutchouc is such as not only to neutralize any tacky property it may possess, but to prepare it so as to prevent it, under most ordinary circumstances, from becoming tacky or adhesive. The mixture also restores the lost elasticity which the caoutchouc loses during the process of grinding it, and not only does this, but serves in many cases, if not always, to impart to it a degree of elasticity and strength higher than it possessed before being manufactured.

I do not claim any application of either coal-naphtha or sulphide of carbon and chloride of sulphur to caoutchouc, as I am aware that applications of such character are not new in the arts; nor do I claim the abstract combination of sulphur with caoutchouc, whether such be effected by the aid of a high degree of heat or without heat, and by the aid of chemical means or liquids, as heretofore employed.

I claim as my invention—

The improved product, manufacture, or composition hereinabove explained, it consisting of caoutchouc, as described, combined with or having applied to it the carbon spirits and chloride of sulphur by means or in manner substantially as specified.

LIVERAS HULL.

Witnesses:
R. H. EDDY,
F. P. HALE, Jr.